W. F. WALKER.
SAFETY LOCK.
APPLICATION FILED OCT. 20, 1913.

1,117,285.

Patented Nov. 17, 1914.
2 SHEETS—SHEET 1.

Witnesses:
C. E. Wessels.
B. G. Richards.

Inventor:
William F. Walker,
By Joshua R. H. Potts
His Attorney.

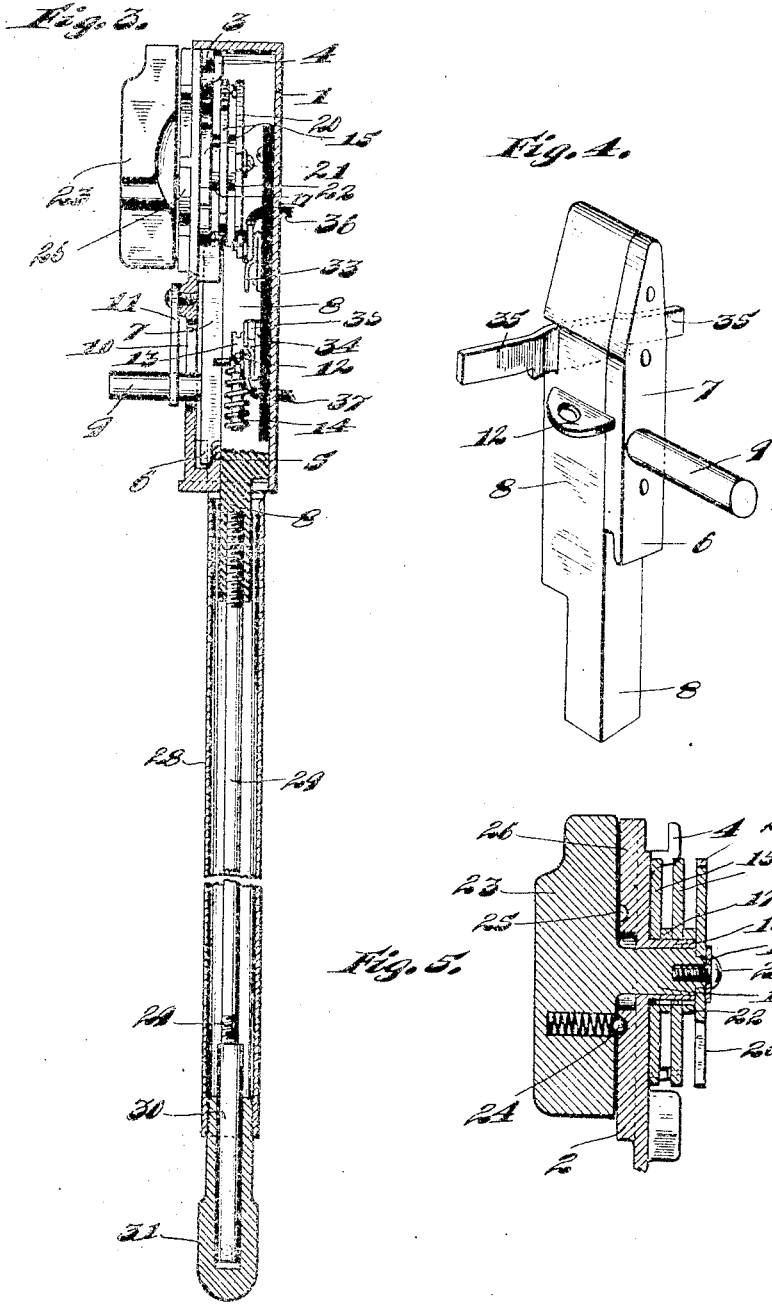

UNITED STATES PATENT OFFICE.

WILLIAM F. WALKER, OF CHICAGO, ILLINOIS, ASSIGNOR OF ONE-EIGHTH TO MATTHEW BORWICK, OF CICERO, ILLINOIS, AND ONE-FOURTH TO CHARLES F. DUSMAN AND ONE-EIGHTH TO ARCHIBALD B. CAMERON, BOTH OF CHICAGO, ILLINOIS.

SAFETY-LOCK.

1,117,285.  Specification of Letters Patent.  Patented Nov. 17, 1914.

Application filed October 20, 1913. Serial No. 796,216.

*To all whom it may concern:*

Be it known that I, WILLIAM F. WALKER, a citizen of the United States, and a resident of the city of Chicago, county of Cook, and State of Illinois, have invented certain new and useful Improvements in Safety-Locks, of which the following is a specification.

My invention relates to improvements in safety locks especially adapted for use in conjunction with automobiles and the like, and has for its object the provision of a simple device of this character which will effectually prevent unauthorized removal of an automobile or the like.

The invention consists in the combinations and arrangements of parts hereinafter described and claimed.

Figure 1:
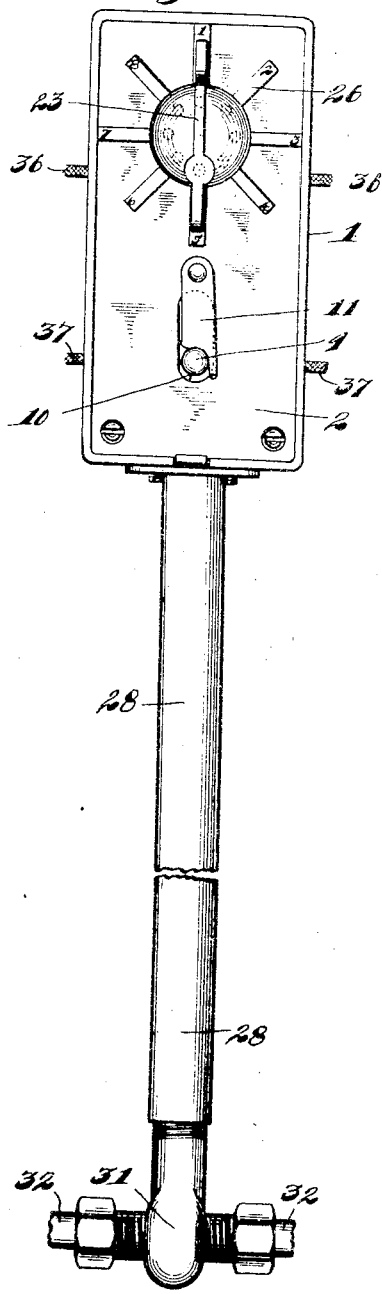
Figure 2:
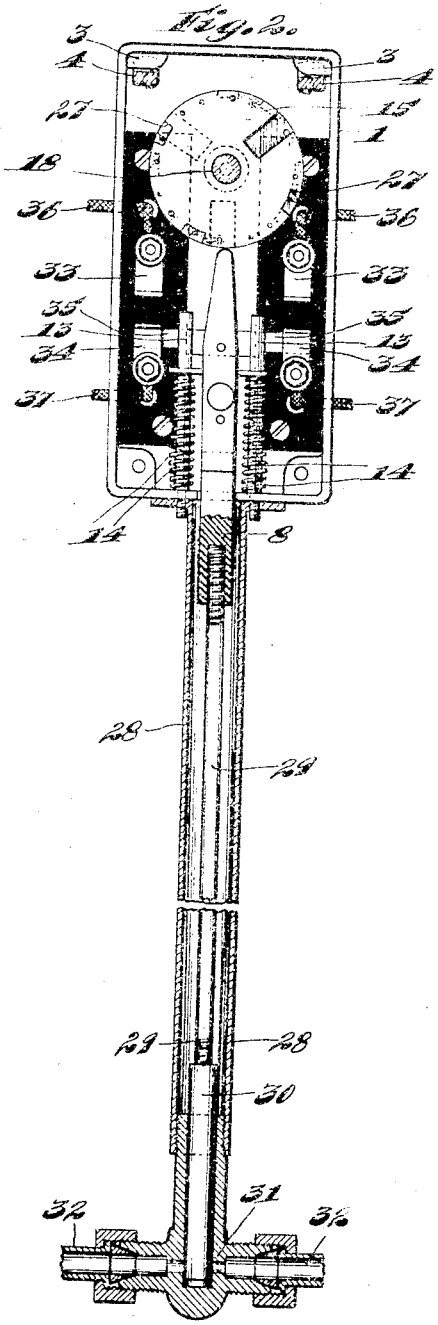

The invention will be best understood by reference to the accompanying drawings forming a part of this specification, and in which, Figure 1 is a face view of a device embodying my invention, Fig. 2 a face view of the device with parts removed and other parts shown in section, Fig. 3, a vertical section of the device, Fig. 4, a perspective view of a slidable bolt employed in the construction, and Fig. 5, an enlarged section taken through a combination lock employed in the device.

The preferred form of construction as illustrated in the drawings comprises a suitable casing 1 adapted to be secured to the dash board or other convenient part of an automobile, said casing being provided with a removable closure 2, as shown. At its upper end casing 1 is provided with inwardly projecting locking lugs 3 and closure 2 is provided with locking lugs 4 adapted to engage lugs 3 and prevent direct outward removal of the corresponding end of said closure, as will be readily understood, said lugs being so arranged as to permit the proper positioning of closure 2 by tilting the lower end thereof. At its lower end closure 2 is provided with an upwardly extending locking lug 5 adapted to engage a downwardly extending locking lug 6 formed on the lower end of a metallic plate 7 secured to the upper end of a bolt 8 slidably mounted in casing 1 and preferably made of hard fiber or other insulating material. Plate 7 carries a pin 9 which projects outwardly through a slot 10 in closure 2, said closure being provided with a swinging keeper 11 adapted to engage pin 9 and hold said pin in the lower portion of slot 10, as indicated in Fig. 1. Bolt 8 is provided at each side with a perforated ear or lug 12 sliding upon guide pins 13 arranged in casing 1, as shown and compression springs 14 are placed on pins 13 between lugs 12 and the bottom of casing 1, said springs tending to press bolt 8 upwardly, as will be readily understood. By this arrangement, it will be observed that when bolt 8 is depressed by depressing pin 9, lug 6 engages lug 5 and positively locks closure 2 in closed position, as long as bolt 8 is in depressed position thus positively preventing tampering with the mechanism within casing 1.

Bolt 8 coöperates with a combination lock arranged on closure 2 in the upper portion of casing 1, said combination lock comprising two combination plates 15 which are rotatably mounted on a hollow bearing or hub 16 formed integrally with the closure 2, as shown in Fig. 5. These plates 15 are the usual combination plates employed in locks of this character and are provided with notches which, when in registration with each other, permit the elevation of bolt 8. Plates 15 are separated by a spacing ring 17 as shown. An operating stem 18 extends through bearing 16 and is provided with a squared projection 19 on its inner end. A third combination plate 20 similar in all respects to plate 15 is secured to the inner end of stem 18 by means of a suitable screw and washer 21, as will be readily understood, and a distancing ring 22 is placed between the outer plate 15 and plate 20 as shown. The specific form of mounting for plates 15 and 20 constitutes a simple and efficient one for the purpose and a construction in which the parts may be securely mounted in operative positions without danger of binding between the different plates of the combination.

At its outer end stem 18 is provided with an operating handle 23 in which is arranged a spring held ball 24, said ball being positioned to coöperate with and enter hemispherical recesses 25 provided in the bars 26 of the dial of the combination formed on the face of closure 2. By this arrangement it will be observed that as handle 23 registers with each of the bars 26 the ball 24 will click in the corresponding recess thus notifying the operator when the proper combination has been effected. Each of the plates 15 and 20 is provided with a plurality of decoy or false notches 27 which are not deep enough to permit the entry of the upper end of bolt 8 far enough to disengage shoulders 6 and 5. By this arrangement a person attempting to operate the combination by the sense of feeling or hearing would be mislead by these decoy notches and thus prevented from setting the combination.

A guard tube 28 extends downwardly from the bottom of the casing 1 and a rod 29 passing through said tube connects bolt 8 with a valve 30 as shown. Valve 30 operates in a valve casing 31 and serves to open and close the passage through said valve casing, said valve casing being connected in the fuel pipe 32 leading to the engine of the automobile, so that valve 30 thus controls the supply of fuel to the engine, said supply being interrupted when bolt 8 is depressed, as will be readily understood. A pair of electric contacts 33 is arranged in casing 1 on opposite sides of bolt 8 upon suitable insulating blocks, as indicated and another pair of electric contacts 34 are arranged in casing 1 below contacts 33, as shown. A metallic connecting bar 35 is secured to bolt 8 in position to connect either contacts 33 when bolt 8 is elevated, or contacts 34 when bolt 8 is depressed. Electric wires 36 are connected with contacts 33 and wires 37 are connected with contacts 34, said wires 36 serving to connect contacts 33 in series with the battery circuit of the automobile and wires 37 serving as a means for grounding the magneto.

In use casing 1 is secured to the ordinary dash board of the automobile and contacts 33 connected in series with the battery and contacts 34 connected in series with the magneto and ground. The valve casing 31 is inserted in the fuel supply pipe of the engine as will be readily understood. When it is desired to lock an automobile against unauthorized removal, pin 9 is depressed thereby breaking the battery circuit of the engine, closing the ground circuit of the magneto and also closing the fuel supply pipe so as to cut off the supply of fuel from the engine. Pin 9 is locked in depressed position by keeper 11 and handle 23 is turned so as to throw the combination of the combination lock and prevent elevation of bolt 8. This will effectually prevent unauthorized starting of the engine and consequent removal of the automobile. When it is desired to start the car, the combination is manipulated to permit elevation of bolt 8, said combination being only in the knowledge of one authorized to operate the car, it can only be properly set by such a person. Then keeper 11 is removed to permit elevation of bolt 8 under the influence of springs 14. This closes the battery circuit and breaks the ground of the magneto thus permitting the formation of sparks in the engine from either source, at the same time the fuel supply pipe is opened to permit the passage of fuel to the engine. In case it is desired to inspect the interior of casing 1 for repairs or otherwise, this may be done when bolt 8 is in elevated position. It will be observed, however, that the closure 2 cannot be removed when the locking device is set at safe position, owing to the engagement of shoulder 6 with shoulder 5, thus preventing tampering with the car or removing the closure 2.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A device of the class described comprising a casing; a battery circuit; a magneto circuit; two sets of electric contacts in said casing, one set being connected in the battery circuit and the other in the magneto circuit; and means for simultaneously opening either of said circuits and closing the other, substantially as described.

2. A device of the class described comprising a casing; a removable closure for said casing; two sets of electric contacts in said casing; a movable member in said casing; and means, operable by said movable member to lock said closure against removal, substantially as described.

3. A device of the class described comprising a casing; a battery circuit; a magneto circuit; two sets of electric contacts in said casing, one set being connected in the battery circuit and the other in the magneto circuit; means for simultaneously opening either of said circuits and closing the other; a fuel supply valve; and means operatively connected with said first mentioned means for simultaneously closing said valve upon opening said battery circuit and opening said valve upon closing of said battery circuit, substantially as described.

4. A device of the class described comprising a casing; a removable closure for said casing; two sets of electric contacts in said casing; a spring held movable member in said casing; means, operable by said movable member arranged to lock said closure against removal; and means, operable by said movable member, arranged to close one set of contacts upon movement in each direction, substantially as described.

5. A device of the class described comprising a casing; two sets of electric contacts in said casing; a movable member in said casing; means, operable by said movable member, arranged to close one set of contacts upon movement in each direction; and a fuel supply valve operatively connected with said movable member, substantially as described.

6. A device of the class described comprising a casing; a removable closure for said casing; two sets of electric contacts in said casing; a movable member in said casing; means, operable by said movable member to lock said closure against removal; and a fuel supply valve operatively connected with said movable member, substantially as described.

7. A device of the class described comprising a casing; two sets of electric contacts in said casing; a spring held movable member in said casing; means, operable by said movable member arranged to close one set of contacts upon movement in each direction; and a fuel supply valve operatively connected with said movable member, substantially as described.

8. A device of the class described comprising a casing; a removable closure for said casing; two sets of electric contacts in said casing; a spring held movable member in said casing; means, operable by said movable member arranged to lock said closure against removal; means, operable by said movable member, arranged to close one set of contacts upon movement in each direction; and a fuel supply valve operatively connected with said movable member, substantially as described.

9. A device of the class described comprising a casing; a removable closure for said casing; a reciprocatory bolt in said casing; a lock arranged to prevent reciprocation of said bolt; a circuit breaker operable by said bolt; and means on said bolt for locking said closure against removal, substantially as described.

10. A device of the class described comprising a casing; a removable closure for said casing; a reciprocatory bolt in said casing; a lock arranged to prevent reciprocation of said bolt; two sets of electric contacts in said casing; means operable by said bolt for closing one set of contacts at each terminal of movement of said bolt; and means on said bolt for locking said closure against removal, substantially as described.

11. A device of the class described comprising a casing; a removable closure for said casing, there being a slot in said closure; a spring held reciprocatory bolt in said casing; a pin on said bolt projecting through said slot; a keeper arranged to lock said pin at the end of its travel; a lock arranged to prevent reciprocation of said bolt; a circuit breaker operable by said bolt; and means on said bolt for locking said closure against removal, substantially as described.

12. A device of the class described comprising a casing; a removable closure for said casing, there being a slot in said closure; a spring held reciprocatory bolt in said casing; a pin on said bolt projecting through said slot; a keeper arranged to lock said pin at the end of its travel; a lock arranged to prevent reciprocation of said bolt; two sets of electric contacts in said casing; means operable by said bolt for closing one set of contacts at each terminal of movement of said bolt; and means on said bolt for locking said closure against removal, substantially as described.

In testimony whereof I have signed my name to this specification in the presence of two subscribing witnesses.

WILLIAM F. WALKER.

Witnesses:
JOSHUA R. H. POTTS,
HELEN F. LILLIS.